(12) United States Patent
Lauermann et al.

(10) Patent No.: US 7,824,189 B1
(45) Date of Patent: Nov. 2, 2010

(54) JUNCTION BOX FOR PHOTOVOLTAIC MODULES

(75) Inventors: Mark Edwin Lauermann, Harrisburg, PA (US); Daniel Eugene Stahl, Middletown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/424,106

(22) Filed: Apr. 15, 2009

(51) Int. Cl.
*H01R 13/00* (2006.01)

(52) U.S. Cl. ............... 439/76.1; 439/535; 439/620.15; 136/246; 174/50.52

(58) Field of Classification Search ............ 439/76.1, 439/535, 620.15, 620.22; 136/246; 174/50.52, 174/50, 50.5
See application file for complete search history.

(56) References Cited

U.S. PATENT DOCUMENTS

| | | | |
|---|---|---|---|
| 4,460,232 A | | 7/1984 | Sotolongo |
| 7,285,006 B1 * | | 10/2007 | Daily et al. ............ 439/441 |
| 7,291,036 B1 * | | 11/2007 | Daily et al. ............ 439/487 |
| 2006/0180196 A1 * | | 8/2006 | Lares et al. ............ 136/251 |
| 2008/0110490 A1 * | | 5/2008 | Duesterhoeft ............ 136/248 |
| 2008/0253092 A1 * | | 10/2008 | Duesterhoeft et al. ....... 361/710 |
| 2009/0025778 A1 * | | 1/2009 | Rubin et al. ............ 136/246 |
| 2009/0084570 A1 * | | 4/2009 | Gherardini et al. ......... 174/51 |
| 2009/0260676 A1 * | | 10/2009 | McMahon et al. .......... 136/251 |
| 2010/0012343 A1 * | | 1/2010 | Ji et al. ............ 174/50.52 |
| 2010/0105245 A1 * | | 4/2010 | Good et al. ............ 439/571 |

FOREIGN PATENT DOCUMENTS

WO  WO 2009/062326 A2  5/2009

OTHER PUBLICATIONS

Information Sheet for Multi-Contact PV-Junction box—PV-JB/SM, Solarline Connectors for Renewable Energy, available on company website—www.multi-contact.com, (4) pages.

* cited by examiner

*Primary Examiner*—Gary F. Paumen

(57) ABSTRACT

A junction box is provided for electrically connecting a photovoltaic (PV) module to a power distribution system having a mating connector. The junction box includes a housing having a mounting side configured to be mounted on the PV module. The housing includes a mating interface and an opening extending into the housing through the mounting side. The housing is configured to mate with the mating connector of the power distribution system at the mating interface. An electrical contact is held by the housing. The electrical contact includes an integrally formed, one-piece body. The body of the electrical contact includes a base, a mating end extending from the base, and a PV module end extending from the base. The base of the body of the electrical contact is held within the opening of the housing such that the mating end extends along the mating interface for engagement with the mating connector. The PV module end of the body extends outwardly from the opening on the mounting side of the housing for engagement with foil of the PV module.

20 Claims, 5 Drawing Sheets

JUNCTION BOX FOR PHOTOVOLTAIC MODULES

BACKGROUND OF THE INVENTION

The subject matter described and/or illustrated herein relates generally to photovoltaic (PV) modules, and, more particularly, to a junction box for interconnecting PV modules with a power distribution system.

To produce electricity from solar energy, PV modules include a plurality of PV cells interconnected in series and/or parallel, according to the desired voltage and current parameters. PV cells are essentially large-area semiconductor diodes. Due to the photovoltaic effect, the energy of photons is converted into electrical power within a PV cell when the PV cell is irradiated by a light source, such as sunlight. Within a PV module, the PV cells are typically sandwiched between a transparent panel and a dielectric substrate. The PV cells within the PV module are typically interconnected by an electrically conductive foil, such as a metallic foil. A plurality of PV modules that are mechanically and electrically connected together is sometimes referred to as a PV panel.

A plurality of PV modules and/or PV panels is often interconnected, in series and/or parallel, to create a PV array. Junction boxes are typically used to electrically connect the PV modules and/or PV panels to each other and to an electrical power distribution system. Each junction box includes a housing that is mounted on the dielectric substrate of the corresponding PV module. The housing holds electrical contacts that engage the foil that interconnects the PV cells through the dielectric substrate to electrically connect the PV module to the junction box. The junction box is electrically connected to the power distribution system via cables that are terminated by connectors that electrically connect to the electrical contacts of the junction box. The foil of the PV module is electrically connected to the junction box by bending the foil up through an opening within the dielectric substrate and into the junction box housing. The foil is then wrapped around the electrical contacts of the junction box within the housing to electrically connect the PV module to the electrical contacts. Bending the foil through the opening of the dielectric substrate and wrapping the foil around the electrical contacts within the housing may increase a difficulty, a time, and/or a cost of connecting the junction box to the PV module.

BRIEF DESCRIPTION OF THE INVENTION

In one embodiment, a junction box is provided for electrically connecting a photovoltaic (PV) module to a power distribution system having a mating connector. The junction box includes a housing having a mounting side configured to be mounted on the PV module. The housing includes a mating interface and an opening extending into the housing through the mounting side. The housing is configured to mate with the mating connector of the power distribution system at the mating interface. An electrical contact is held by the housing. The electrical contact includes an integrally formed, one-piece body. The body of the electrical contact includes a base, a mating end extending from the base, and a PV module end extending from the base. The base of the body of the electrical contact is held within the opening of the housing such that the mating end extends along the mating interface for engagement with the mating connector. The PV module end of the body extends outwardly from the opening on the mounting side of the housing for engagement with foil of the PV module.

In another embodiment, a junction box and photovoltaic (PV) module assembly includes a PV module having a plurality of PV cells interconnected by a foil, and a junction box. The junction box includes a housing having a mounting side mounted on the PV module. The housing includes a mating interface and an opening extending into the housing through the mounting side. The housing is configured to mate with a mating connector at the mating interface. An electrical contact is held by the housing. The electrical contact includes an integrally formed, one-piece body. The body of the electrical contact includes a base, a mating end extending from the base, and a PV module end extending from the base. The base of the body of the electrical contact is held within the opening of the housing such that the mating end extends along the mating interface for engagement with the mating connector. The PV module end of the body extends outwardly from the opening on the mounting side of the housing. The PV module end of the body is engaged with the foil of the PV module.

In another embodiment, a junction box is provided for electrically connecting a photovoltaic (PV) module to a power distribution system having a mating connector. The junction box includes a housing having a mounting side and an exterior side. The mounting side is configured to be mounted on the PV module. The housing includes a mating interface and an opening extending through the mounting side and the exterior side. The housing is configured to mate with the mating connector of the power distribution system at the mating interface. An electrical contact is held by the housing. The electrical contact includes a mating end and a PV module end. The mating end extends along the mating interface for engagement with the mating connector. The PV module end extends outwardly from the opening on the mounting side of the housing for engagement with foil of the PV module. A cover is received within the opening of the housing at the exterior side for closing the opening at the exterior side. An o-ring is engaged between the housing and the cover for sealing the cover with the housing.

DETAILED DESCRIPTION OF THE INVENTION

Figure 1:
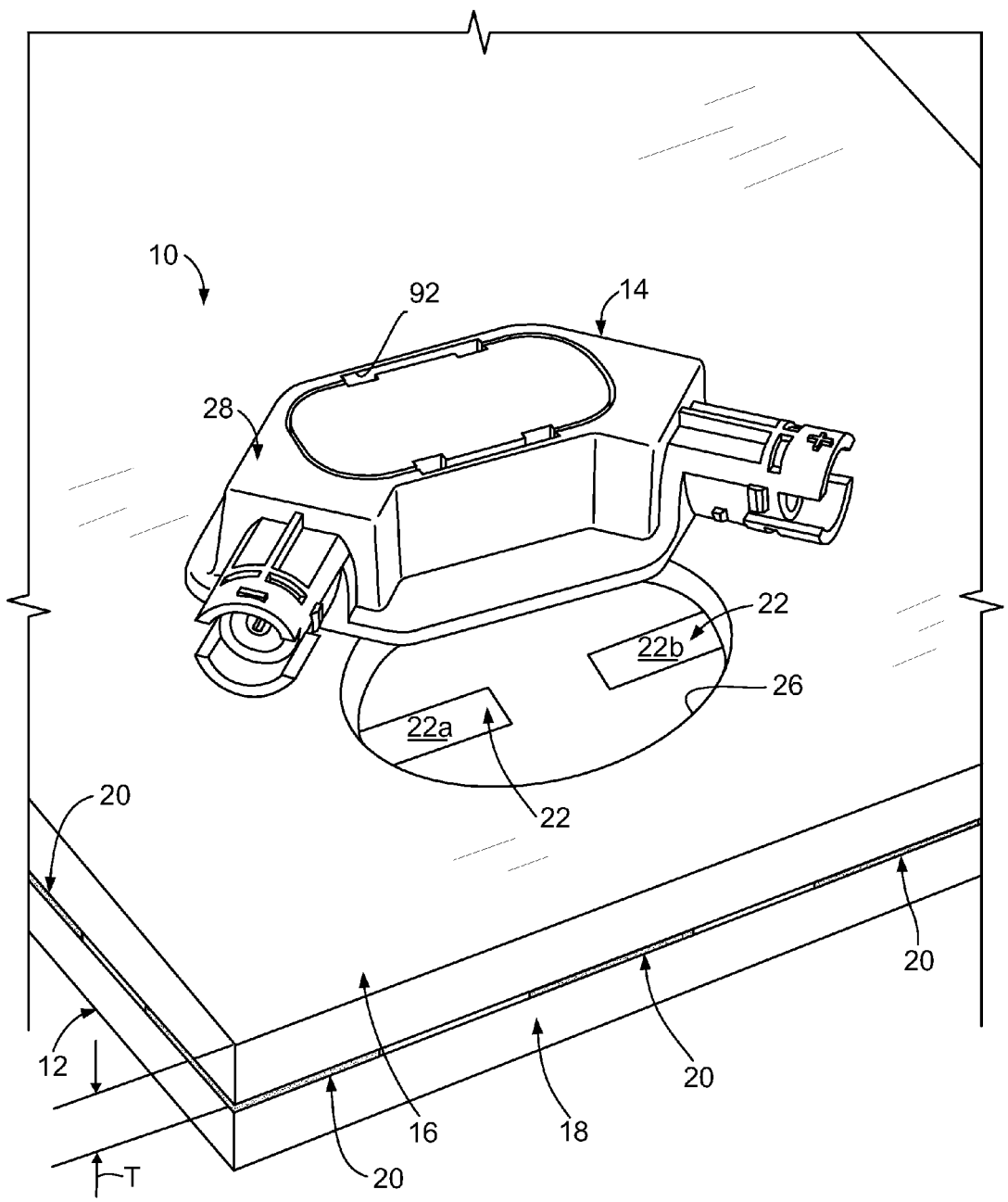
FIG. 1 is a partially exploded perspective view of an exemplary embodiment of a junction box and photovoltaic (PV) module assembly.

FIG. 1 is a partially exploded perspective view of an exemplary embodiment of a junction box and photovoltaic (PV) module assembly 10. The assembly 10 includes a PV module 12 and a junction box 14. Only a portion of the PV module 12 is shown herein. The PV module 12 includes a dielectric substrate 16, a transparent panel 18, and a plurality of PV cells 20 held between the dielectric substrate 16 and the transparent panel 18. When irradiated by a light source (such as, but not limited to, sunlight and/or the like), the PV cells 20 convert the energy of photons into electrical power. Each PV cell 20 may be any type of PV cell 20, such as, but not limited to, a thin film PV cell and/or the like. The PV cells 20 of the PV module 12 are electrically interconnected with each other, in series and/or parallel, by an electrically conductive foil 22, such as, but not limited to, a metallic foil and/or the like. The foil 22 of the PV module is exposed through an opening 26 within the dielectric substrate 16. In the exemplary embodiment, the foil 22 includes two electrical contact portions 22a and 22b that are exposed through the opening 26.

The junction box 14 is mounted on the PV module 12 for electrically connecting the PV module 12 to a power distribution system (not shown). The power distribution system distributes electrical power generated by the PV module 12 to an electrical load (not shown), an electrical storage device (not shown), and/or the like. The junction box 14 may also electrically connect the PV module 12 to other PV modules (not shown). For example, a plurality of PV modules may be mechanically and electrically interconnected, in series and/or parallel, to create a PV panel (not shown). Moreover, a plurality of PV modules and/or PV panels may be electrically interconnected to create a PV array.

The transparent panel 18 of the PV module 12 is transparent to light emitted from the light source. The transparent panel 18 may be transparent to any wavelengths of electromagnetic radiation from any light source. In the exemplary embodiment, the transparent panel 18 includes only a single layer. However, alternatively the transparent panel 18 includes any number of layers greater than one. Each layer of the transparent panel 18 may be fabricated from the same or different material(s) from other layers of the transparent panel 18. Similarly, although shown as including only one layer, the dielectric substrate 16 may include any number of layers. Each layer of the dielectric substrate 16 may be fabricated from the same or different material(s) from other layers of the dielectric substrate 16.

Figure 2:
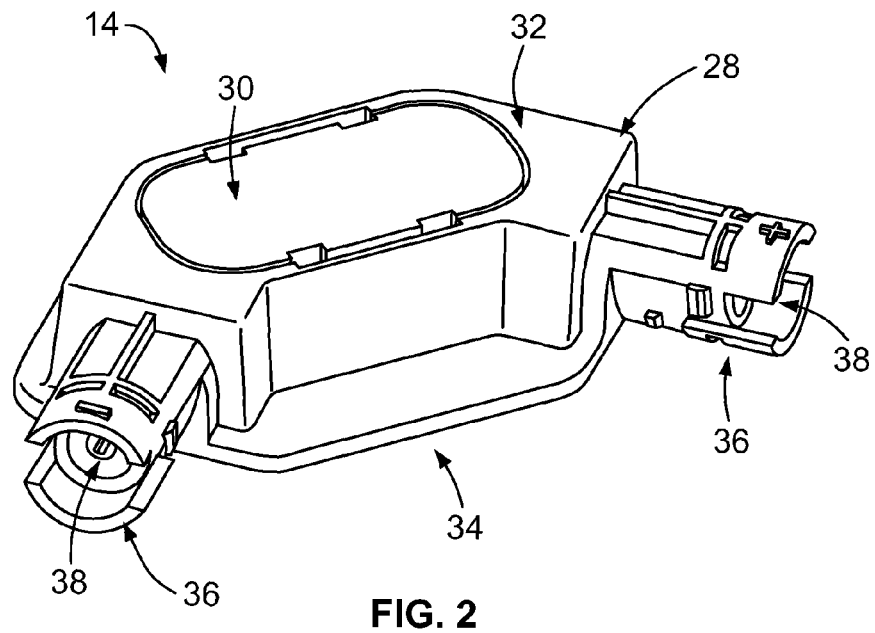
FIG. 2 is a perspective view of an exemplary embodiment of a junction box of the assembly shown in FIG. 1.

FIG. 2 is a perspective view of an exemplary embodiment of the junction box 14. The junction box 14 includes a housing 28 and an optional cover 30. The housing 28 has an exterior side 32 and a mounting side 34. In the exemplary embodiment, the housing 28 of the junction box 14 includes a pair of mating interfaces 36. The housing 28 is configured to mate with a corresponding mating connector (not shown) of the power distribution system (not shown) at each of the mating interfaces 36. Each of the mating connectors of the power distribution system terminates a corresponding electrical wire or cable of the power distribution system. As will be described below, mating of the housing 28 with the mating connectors establishes an electrical connection between the junction box 14 and the wires and/or cables of the power distribution system. At an end (not shown) opposite the mating connector, each wire or cable of the power distribution system may be electrically connected to an electrical load (not shown), an electrical storage device (not shown), the junction box (not shown) of another PV module (not shown), another component of the power distribution system, and/or the like.

In the exemplary embodiment, each mating interface 36 of the housing 28 includes a mating receptacle 38 that receives a plug (not shown) of the corresponding mating connector therein. In addition or alternative to the mating receptacle 38, each mating interface 36 of the housing 28 may include a plug (not shown) that is received within a receptacle (not shown) of the corresponding mating connector. Although the housing 28 includes two mating interfaces 36 in the exemplary embodiment, the housing 28 may have any number of mating interfaces 36 for mating with any number of mating connectors.

Figure 3:
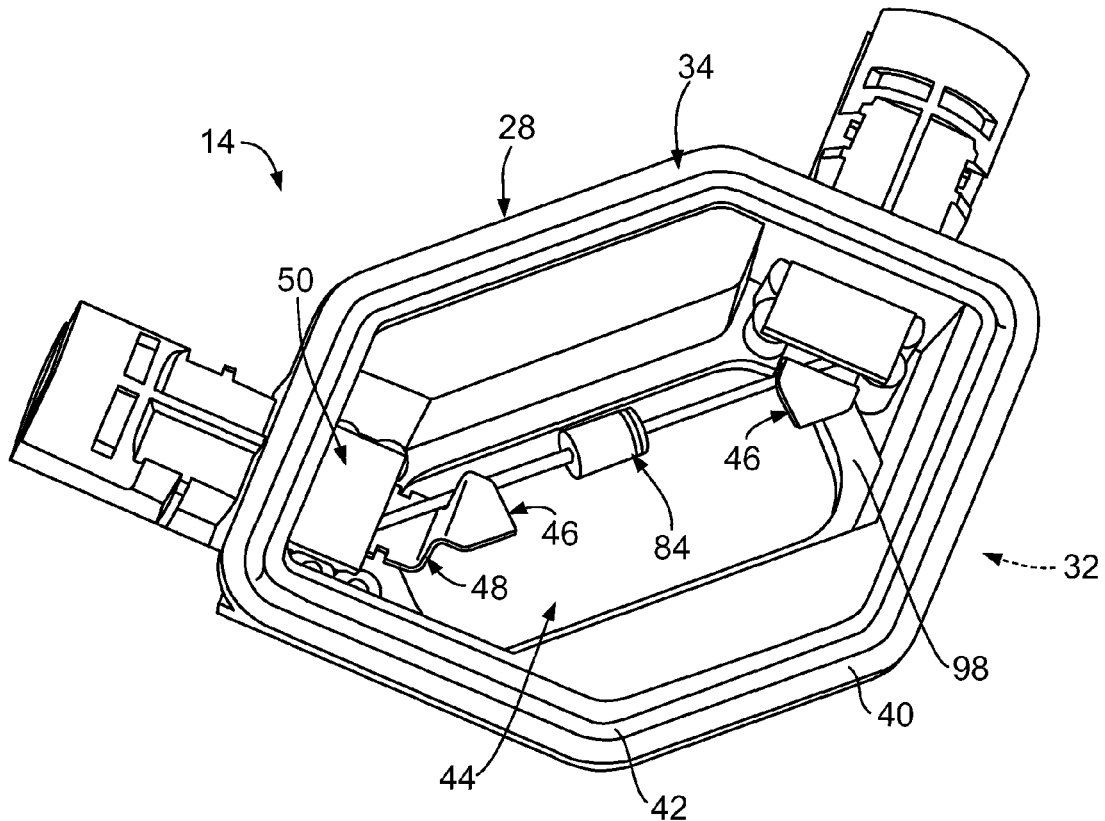
FIG. 3 is another perspective view of the junction box shown in FIG. 1 viewed from a different angle than FIG. 2.

FIG. 3 is another perspective view of the junction box 14 viewed from a different angle than FIG. 2. Specifically, FIG. 2 illustrates the exterior side 32 of the junction box 14, while FIG. 3 illustrates the mounting side 34 of the junction box 14. In FIG. 3, the cover 30 (FIGS. 2 and 6) has been removed from the junction box 14. The mounting side 34 of the housing 28 is configured to be mounted on the dielectric substrate 16 (FIG. 1) of the PV module 12 (FIG. 1). In the exemplary embodiment, the mounting side 34 of the housing 28 includes a mounting surface 40 that faces the dielectric substrate 16 when the housing 28 is mounted on the dielectric substrate 16. The housing 28 may be mounted on the dielectric substrate 16 using any suitable method, process, means, structure, connection type, and/or the like. In the exemplary embodiment, the housing 28 is mounted on the dielectric substrate 16 using an adhesive (not shown), such as, but not limited to, room temperature vulcanizing (RTV) silicone and/or the like. In some embodiments, the adhesive seals the housing 28 to the dielectric substrate 16. The mounting surface 40 includes an optional groove 42 that may accommodate excess adhesive during mounting of the housing 28 on the dielectric substrate 16. In some embodiments, the mounting surface 40 of the housing 28 engages the dielectric substrate 16 when the housing 28 is mounted on the dielectric substrate 16. However, it should be understood that when adhesive is used to mount the housing 28 on the dielectric substrate 16, a portion or all of the mounting surface 40 may not engage the dielectric substrate 16, but rather the adhesive may space a portion or all of the mounting surface 40 from the dielectric substrate 16.

The housing 28 includes an opening 44 that extends into the housing 28 through the mounting side 34. In the exemplary embodiment, the opening 44 also extends through the exterior side 32. The housing 28 holds a plurality of electrical contacts 46. Each electrical contact 46 is held by the housing 28 using a contact retainer 50 that engages both the housing 28 and the corresponding electrical contact 46. As will be described below, each the electrical contact 46 establishes an electrical connection between a corresponding one of the electrical contact portions 22a and 22b (FIG. 1) of the foil 22 (FIG. 1) of the PV module 12 and a corresponding one of the mating connectors. Although two electrical contacts 46 are shown, the junction box 14 may include any number of electrical contacts 46 for electrical connection to any number of the electrical contact portions 22a and 22b and for electrical connection with any number of mating connectors.

Figure 4:
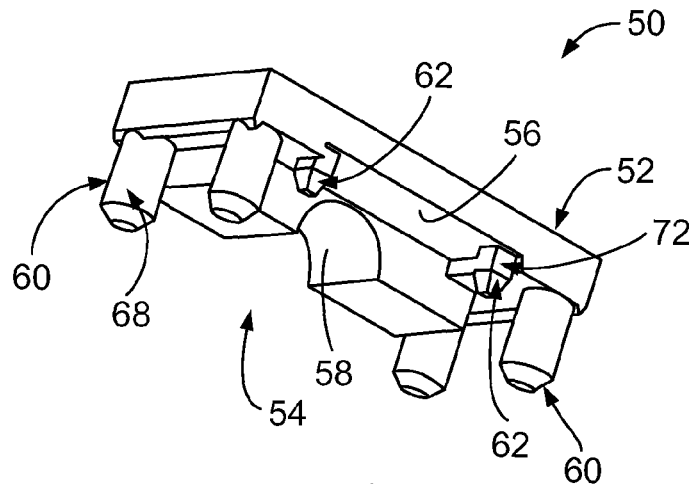
FIG. 4 is a perspective view of an exemplary embodiment of a contact retainer of the junction box shown in FIGS. 2 and 3.

FIG. 4 is a perspective view of an exemplary embodiment of a contact retainer 50. Each contact retainer 50 includes a body 52 having a mounting side 54 that engages the housing 28 (FIGS. 1-3, 5, and 6) of the junction box 14 (FIGS. 1-3, 5, and 6). In the exemplary embodiment, the mounting side 54 of the contact retainer body 52 includes a base engagement surface 56, a contact alignment surface 58, a plurality of housing connectors 60, and a plurality of contact connectors

62. When the contact retainer 50 is mounted on the junction box housing 28, the base engagement surface 56 engages a base 64 (FIG. 5) of the corresponding electrical contact 46 (FIGS. 3, 5, and 6), and the contact alignment surface 58 engages a stem 67 (FIG. 5) of the corresponding electrical contact 46. In the exemplary embodiment, the contact alignment surface 58 includes an arcuate shape that is complementary to the exemplary stem 67 of the corresponding electrical contact 46, and the base engagement surface 56 includes an approximately planar shape that is complementary to the exemplary base 64 of the corresponding electrical contact 46. In addition or alternative to the arcuate shape, the contact alignment surface 58 may include any other shape for engagement with any shaped stem 67. Similarly, in addition or alternative to the approximately planar shape, the base engagement surface 56 may include any other shape for engagement with any shaped base 64.

The housing connectors 60 extend on the mounting side 54 of the contact retainer body 52 for engagement with the junction box housing 28. In the exemplary embodiment, each housing connector 60 includes a leg 68 extending outwardly on the mounting side 54 of the contact retainer body 52. Each leg 68 is configured to be received within a corresponding connector opening 70 (FIG. 5) of the junction box housing 28. In the exemplary embodiment, each leg 68 engages the corresponding connector opening 70 of the junction box housing 28 with an interference fit to connect the contact retainer body 52 to the housing 28. In addition or alternative to the legs 68 and/or the interference fit thereof, the contact module body 52 may be connected to the junction box housing 28 using any other structure, means, connector, and/or the like, such as, but not limited to, using an interference fit and/or the like. Although four legs 68 are shown, the contact retainer body 52 may include any number of the legs 68 for reception within any number of connector openings 70.

The contact connectors 62 extend on the mounting side 54 of the contact retainer body 52 for engagement with the base 64 of the corresponding electrical contact 46. In the exemplary embodiment, each contact connector 62 includes an extension 72 extending outwardly on the mounting side 54 of the contact retainer body 52. Each extension 72 is configured to be received within a corresponding contact opening 74 (FIG. 5) of the corresponding electrical contact 46. In the exemplary embodiment, each extension 72 engages the corresponding contact opening 74 of the corresponding electrical contact 46 with a clearance fit to connect the contact retainer body 52 to the corresponding electrical contact 46. The contact module body 52 may be connected to the corresponding electrical contact 46 using any other structure, means, connector, and/or the like in addition or alternative to the extension 72 and/or the clearance fit thereof, such as, but not limited to, using an interference fit and/or the like. In the exemplary embodiment, the contact retainer body 52 includes two extensions 72. However, the contact retainer body 52 may include any number of the extensions 72 for reception within any number of contact openings 74.

Figure 5:
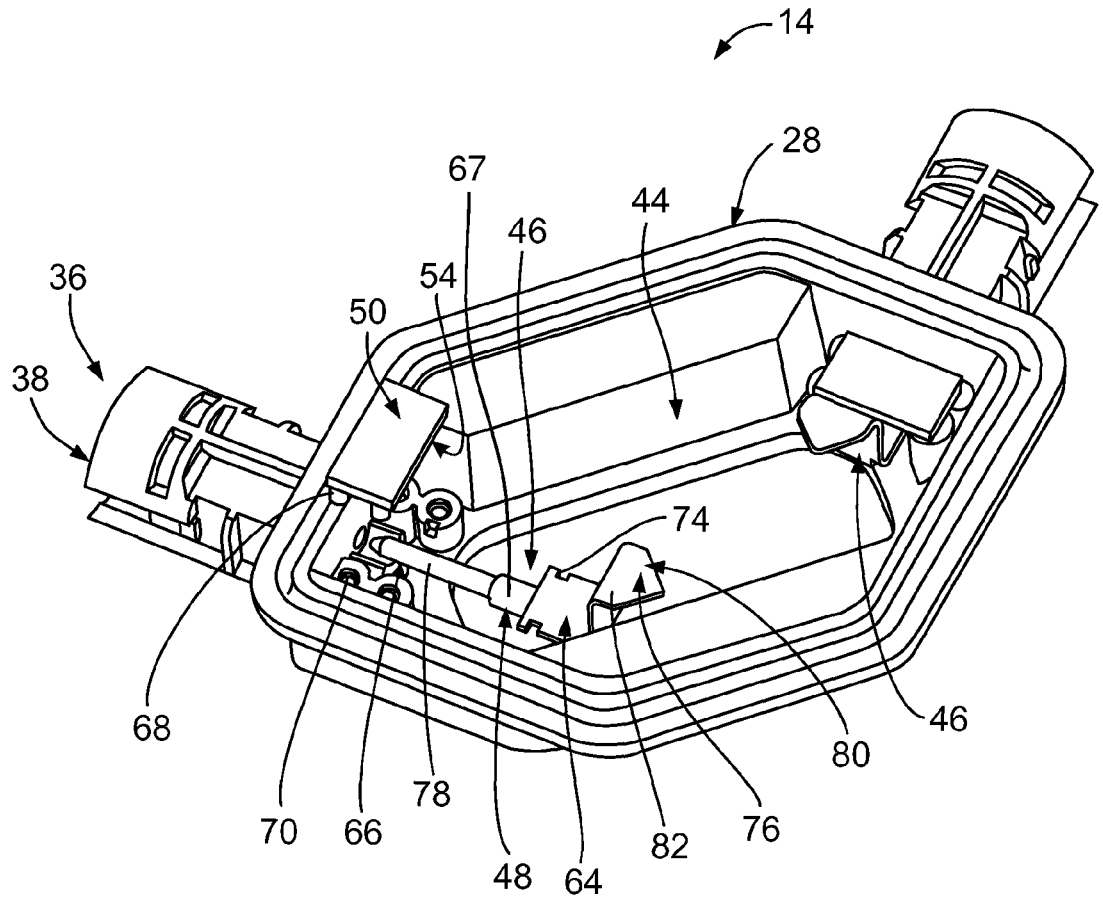
FIG. 5 is a partially exploded perspective view of the junction box shown in FIGS. 2 and 3 illustrating an exemplary embodiment of an electrical contact of the junction box.

FIG. 5 is a partially exploded perspective view of the junction box 14. In FIG. 5, the cover 30 (FIGS. 2 and 6) has been removed from the junction box 14. Each electrical contact 46 includes a body 48. The body 48 of each electrical contact 46 includes the base 64, the stem 67 extending outwardly from the base 64, a mating end 66 extending outwardly from the stem 67, and a PV module end 76 extending outwardly from the base 64. The base 64 includes the contact openings 74. Although two contact openings 74 are shown, the base 64 may include any number of the contact openings 74. In the exemplary embodiment, the base 64 includes an approximately planar shape. Additionally or alternatively, the base 64 may include any other shape. The mating end 66 extends outwardly from the base 64 for engagement with a corresponding mating contact (not shown) of the corresponding mating connector (not shown). In the exemplary embodiment, the mating end 66 includes a pin 78 that is configured to be received within a socket (not shown) of the corresponding mating contact. The mating end 66 of the electrical contact body 48 may include, in addition or alternative to the pin 78, any other structure, means, shape, geometry, and/or the like for electrically connecting to the corresponding mating contact, such as, but not limited to, a socket (not shown) that receives a pin (not shown) of the corresponding mating contact therein, and/or the like.

The PV module end 76 of the electrical contact body 48 extends outwardly from the base 64 for engagement with a corresponding one of the electrical contact portions 22a and 22b (FIG. 1) of the foil 22 (FIG. 1) of the PV module 12 (FIG. 1). In the exemplary embodiment, the PV module end 76 includes an approximately planar tab 80 that includes an engagement surface 82 that engages the corresponding electrical contact portion 22a or 22b. As shown herein, the tab 80, and thus the engagement surface 82, extends approximately parallel with the base 64. However, the tab 80 and/or the engagement surface 82 may extend at any other angle relative to the base 64, such as, but not limited to, an acute or obtuse angle relative to the base 64, and/or the like. Moreover, the engagement surface 82 of the tab 80 may or may not extend approximately parallel to some or all portions of the foil 22.

In addition or alternative to the approximately planar tab 80, the PV module end 76 may include any other structure, means, shape, geometry, and/or the like for electrically connecting to the corresponding electrical contact portion 22a or 22b of the foil 22 of the PV module 12, such as, but not limited to, a hook shape, any other non-planar shape, a flexible structure, a resilient structure, and/or the like. Forming at least a portion of the PV module end 76 with a flexible and/or resilient structure (such as, but not limited to, a flexible and/or resilient beam, a flexible and/or resilient hook, and/or the like) may facilitate accommodating different thicknesses of the dielectric substrate 16 (FIG. 1). In embodiments wherein the PV module end 76 includes other structures, means, shapes, geometries, and/or the like in addition or alternative to the tab 80, some or all portions of such other structures, means, shapes, geometries, and/or the like may or may not extend approximately parallel to some or all portions of the foil 22.

The body 48 of the electrical contact 46 may be formed using any suitable process, means, method, structure, and/or the like, such as, but not limited to, any stamping process, any cutting process, any forming process, and/or the like. In some embodiments, the electrical contact body 48 is an integrally formed, one piece body. For example, the base 64, the mating end 66, and the PV module end 76 are optionally formed integrally as one piece. In some embodiments, the entirety of the electrical contact body 48 is stamped and formed out of a single sheet of material.

When held by the junction box housing 28 using the corresponding contact retainer 50, the base 64 of each electrical contact 46 is held within the opening 44 of the housing 28. Specifically, the base 64 is engaged with the base engagement surface 56 (FIG. 4) of the corresponding contact retainer 50 such that the base 64 is held between the mounting side 54 of the corresponding contact retainer 50 and the housing 28. The extensions 72 (FIG. 4) of the contact connectors 62 are received within the contact openings 74 of the electrical contact base 64 to connect the contact retainer 50 to the base 64.

Each leg 68 of the contact retainer 50 is received within the corresponding connector opening 70 of the housing 28 to connect the contact retainer 50 to the housing 28. When the base 64 is held by the housing 28 using the corresponding contact retainer 50, the mating end 66 of the electrical contact 46 extends along a corresponding one of the mating interfaces 36 of the housing 28 for engagement with the corresponding mating contact of the corresponding mating connector. Specifically, the mating end 66 extends within a corresponding one of the mating receptacles 38 of the housing 28. Extension of the mating end 66 within the mating receptacle 38 is best seen in FIG. 6.

Referring again to FIG. 3, the junction box 14 optionally includes a diode 84 that electrically connects the electrical contacts 46 of the junction box 14 together. The diode 84 may enable electrical power generated by another PV module (not shown) that is electrically connected to the junction box 14 to bypass the PV module 12. In the exemplary embodiment, the diode 84 is engaged with, and thereby electrically connected to, the base 64 of each of the electrical contacts 46. Alternatively, the diode 84 is engaged with, and thereby electrically connected to, any other portion of the body 48 of each of the electrical contacts 46. The diode 84 may be engaged with and electrically connected to each electrical contact 46 using any suitable method, process, structure, connector, means, and/or the like, such as, but not limited to, being welded to the electrical contacts 46, being soldered to the electrical contacts 46, being brazed to the electrical contacts 46, and/or the like.

Figure 6:
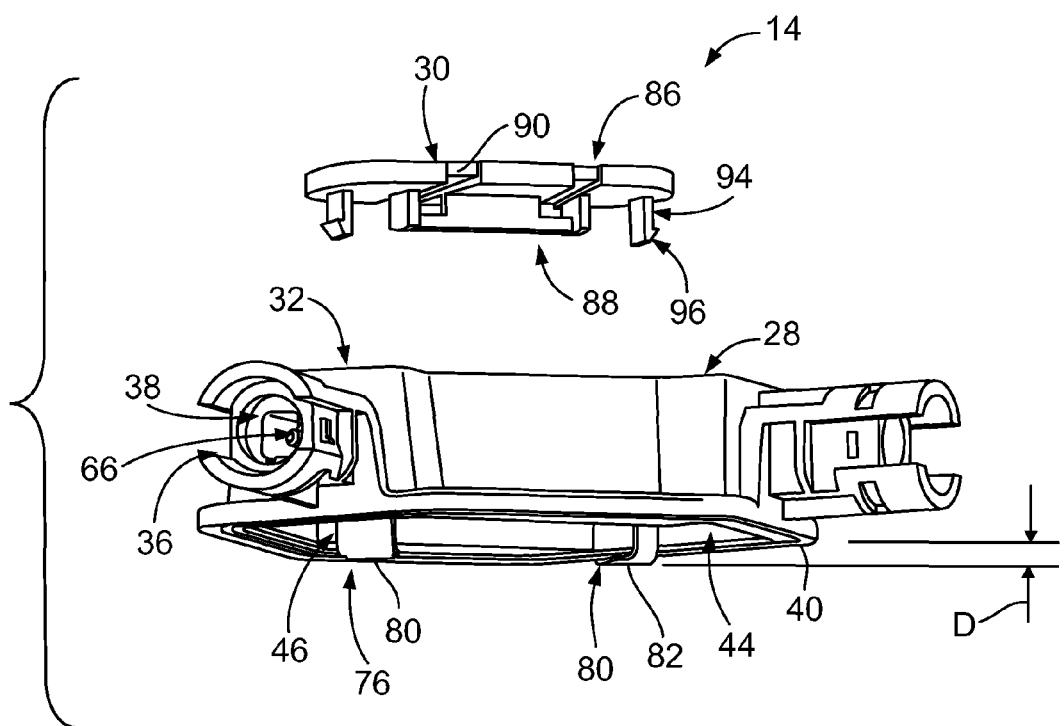
FIG. 6 is another partially exploded perspective view of the junction box shown in FIGS. 2, 3, and 5 illustrating an exemplary embodiment of a cover of the junction box.

FIG. 6 is another partially exploded perspective view of the junction box 14. When held by the junction box housing 28 using the corresponding contact retainer 50 (FIGS. 3-5), the PV module end 76 of each electrical contact 46 extends outwardly from the opening 44 of the junction box housing 28 on the mounting side 34 thereof. The tab 80 of the PV module end 76 extends outwardly from the opening 44 of the housing 28 past the mounting surface 40 of the housing 28. Specifically, the engagement surface 82 of the tab 80 is offset from the mounting surface 40 in a direction away from the housing 28 by a distance D. In some embodiments, the distance D is approximately equal to a thickness T (FIG. 1) of the dielectric substrate 16 (FIG. 1) of the PV module 12 (FIG. 1). In the exemplary embodiment, and when held by the housing 28 as shown herein, the tab 80 (and therefore the engagement surface 82) of the PV module end 76 extends approximately parallel to the mounting surface 40 of the housing 28. However, the tab 80 and/or the engagement surface 82 may extend at any other angle relative to the mounting surface 40 when the electrical contact 46 is held by the housing 28, such as, but not limited to, an acute or obtuse angle relative to the mounting surface 40, and/or the like.

When the junction box 14 is mounted on the dielectric substrate 16 of the PV module 12, the tabs 80 of the PV module ends 76 of the electrical contacts 46 extend through the opening 26 (FIG. 1) within the dielectric substrate 16. The engagement surfaces 82 of the tabs 80 engage the corresponding electrical contact portion 22a or 22b (FIG. 1) of the foil 22 (FIG. 1) of the PV module 12 (FIG. 1) to electrically connect each electrical contact 46 to the corresponding electrical contact portion 22a and 22b. Each electrical contact 46 of the junction box 14 thereby establishes an electrical connection between a corresponding one of the electrical contact portions 22a and 22b of the foil 22 and a corresponding one of the mating connectors. Accordingly, the junction box 14 establishes an electrical connection between the PV module 12 and the wires and/or cables of the power distribution system (not shown). The engagement surfaces 82 of each of the electrical contacts 46 may be held in engagement with the corresponding electrical contact portion 22a or 22b of the foil 22 using any suitable method, process, structure, means, connection type, and/or the like, such as, but not limited to, using solder and/or the like.

The cover 30 is optionally provided for closing the opening 44 of the housing 28 at the exterior side 32 of the housing 28. In addition or alternative to the cover 30, the opening 44 of the housing 28 may be filled with a dielectric material (such as, but not limited to, potting and/or the like) to environmentally seal the opening 44. The cover 30 includes a body 86 having a mounting side 88 that faces the exterior side 32 of the housing 28. The cover 30 is optionally connected to the housing 28 using an adhesive (not shown), such as, but not limited to, potting, RTV silicone, and/or the like. In some embodiments, the adhesive seals the cover 30 with the housing 28. In some embodiments, the mounting side 88 of the cover 30 engages the exterior side 32 of the housing 28 when the cover 30 is mounted on the housing 28. However, it should be understood that the adhesive may space a portion or all of the mounting side 88 of the cover 30 from the exterior side 32 of the housing 28. Optionally, the cover 30 and/or the housing 28 each includes one or more respective openings 90 and 92 (the openings 92 can be seen in FIG. 1) to allow air and/or excess adhesive to escape during curing of the adhesive.

The cover 30 includes a plurality of optional latch members 94 extending outwardly on the mounting side 88 of the cover body 86. Each of the latch members 94 includes a hook 96 that engages a latch surface 98 (FIG. 3) of the housing 28 to hold the cover 30 on the housing 28 during curing of the adhesive. Alternatively, the cover 30 is not connected to the housing 28 using the adhesive, but rather is only connected to the housing 28 using the latch members 94. Although two latch members 94 are shown, the cover 30 may include any number of the latch members 94.

Figure 7:
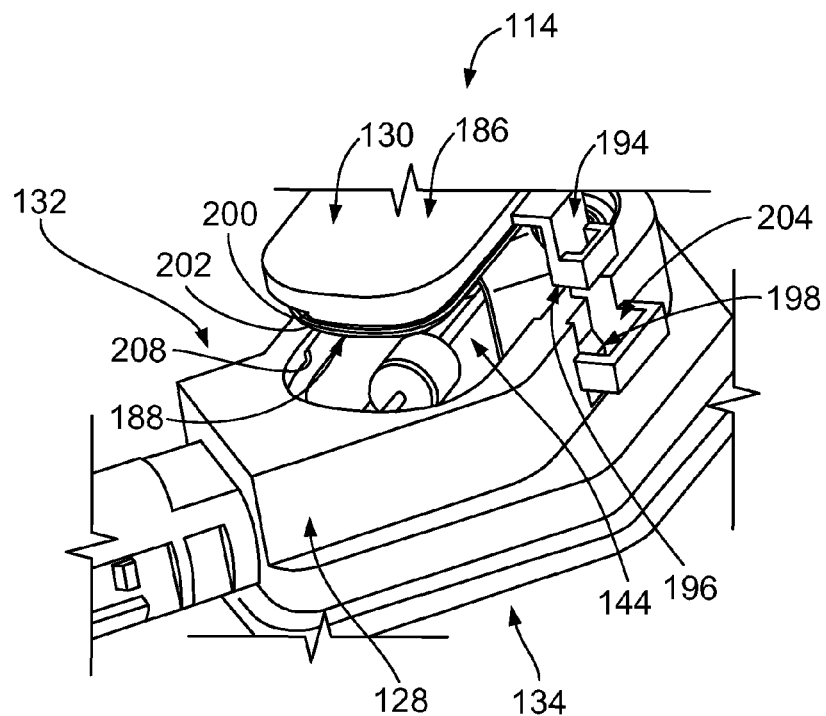
FIG. 7 is a partially exploded perspective view of a portion of an exemplary alternative embodiment of a junction box having an exemplary alternative embodiment of a cover.
Figure 8:
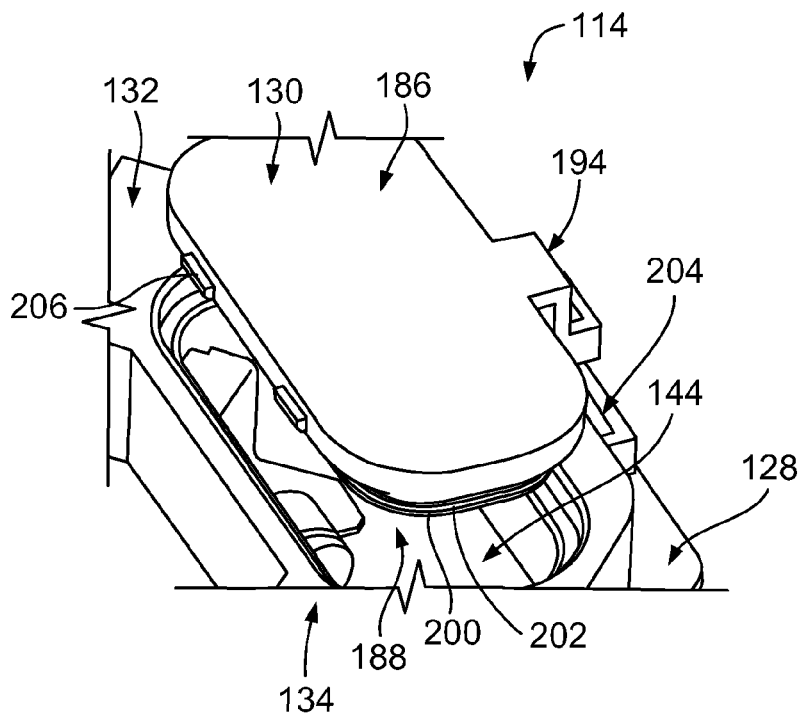
FIG. 8 is another partially exploded perspective view of the junction box shown in FIG. 7 viewed from a different angle than FIG. 7.

FIG. 7 is a partially exploded perspective view of a portion of an exemplary alternative embodiment of a junction box 114 having an exemplary alternative embodiment of a cover 130. FIG. 8 is another partially exploded perspective view of the junction box 114 viewed from a different angle than FIG. 7. The junction box 114 includes a housing 128 and the cover 130. The housing 128 has an exterior side 132 and a mounting side 134. The mounting side 134 of the housing 128 is configured to be mounted on the dielectric substrate 16 (FIG. 1) of the PV module 12 (FIG. 1). The housing 128 includes an opening 144 that extends through the exterior side 132. The cover 130 is received within the opening 144 at the exterior side 132 for closing the opening 144 at the exterior side 132. In addition or alternative to the cover 130, the opening 144 of the housing 128 may be filled with a dielectric material (such as, but not limited to, potting and/or the like) to environmentally seal the opening 144.

The cover 130 includes a body 186 having a mounting side 188 that faces the exterior side 132 of the housing 128. The mounting side 188 of the cover body 186 includes an optional o-ring groove 200 that receives an o-ring 202 for sealing the engagement between the cover body 186 and the housing 128. It should be understood that when the o-ring 202 is used to seal the engagement between the cover body 186 and the housing 128, a portion or all of the mounting side 188 of the cover body 186 may not engage the exterior side 132 of the housing 128, but rather the o-ring 202 may space a portion or all of the mounting side 188 of the cover body 186 from the exterior side 132 of the housing 128.

The cover body 186 includes a latch member 194 extending outwardly on the mounting side 188 of the cover body 186. The latch member 194 is received within a latch opening 204 of the housing 128. The latch member 194 includes a hook 196 (not visible in FIG. 8) that engages a latch shoulder 198 (not visible in FIG. 8) of the housing 128 to removably latch the cover 130 on the housing 128. In the exemplary embodiment, the cover body 186 includes a plurality of latch extensions 206 (not visible in FIG. 7) that are received within openings 208 of the housing 128 to facilitate holding the cover 130 on the housing 128. Although one latch member 194 is shown, the cover 130 may include any number of the latch members 194 for reception within any number of latch openings 204 of the housing 128. In the exemplary embodiment, the cover body 186 includes two latch extensions 206. However, the cover body 186 may include any number of the latch extensions 206 for reception within any number of openings 208 of the housing 128.

Figure 9:
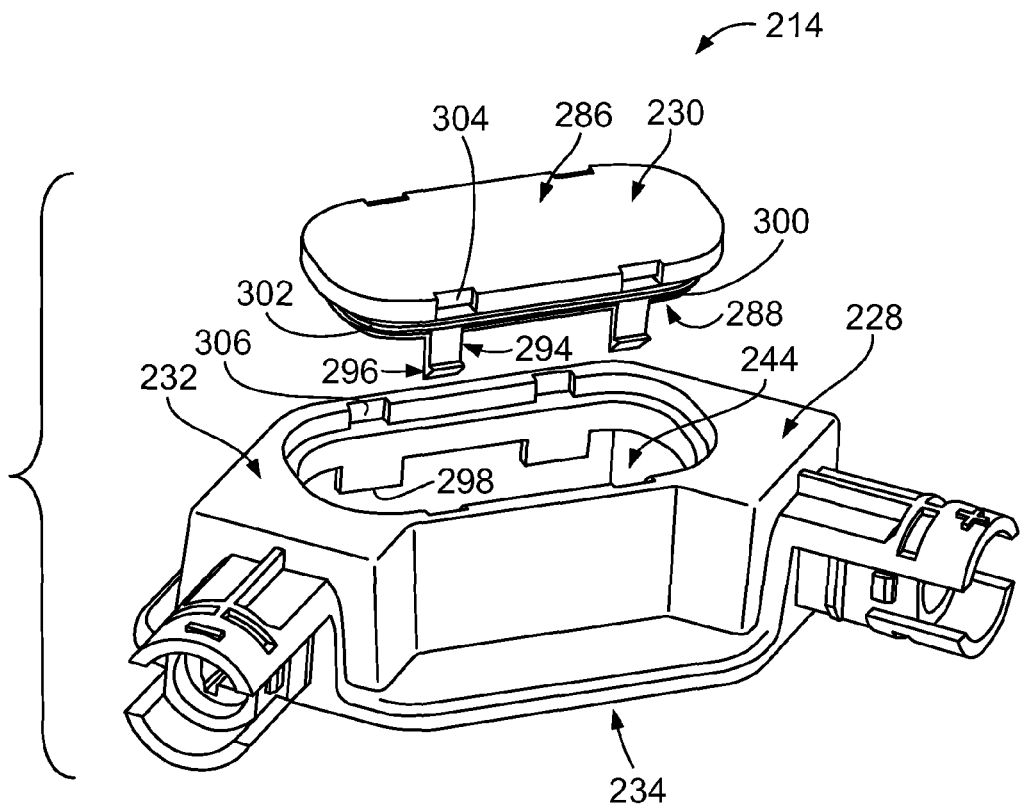
FIG. 9 is a partially exploded perspective view of a portion of another exemplary alternative embodiment of a junction box having another exemplary alternative embodiment of a cover.

FIG. 9 is a partially exploded perspective view of a portion of another exemplary alternative embodiment of a junction box 214 having another exemplary alternative embodiment of a cover 230. The junction box 214 includes a housing 228 and the cover 230. The housing 228 has an exterior side 232 and a mounting side 234. The mounting side 234 of the housing 228 is configured to be mounted on the dielectric substrate 16 (FIG. 1) of the PV module 12 (FIG. 1). The housing 228 includes an opening 244 that extends through the exterior side 232. The cover 230 is received within the opening 244 at the exterior side 232 for closing the opening 244 at the exterior side 232. In addition or alternative to the cover 230, the opening 244 of the housing 228 may be filled with a dielectric material (such as, but not limited to, potting and/or the like) to environmentally seal the opening 244.

The cover 230 includes a body 286 having a mounting side 288 that faces the exterior side 232 of the housing 228. The mounting side 288 of the cover body 286 includes an optional o-ring groove 300 that receives an o-ring 302 for sealing the engagement between the cover body 286 and the housing 228. The cover body 286 includes a plurality of optional latch members 294 extending outwardly on the mounting side 288 of the cover body 286. Each of the latch members 294 includes a hook 296 that engages a corresponding latch surface 298 of the housing 228 to facilitate holding the cover 230 on the housing 228. Although the cover body 286 includes four latch members 294 in the exemplary embodiment, the cover 230 may include any number of the latch members 294. Optionally, the cover body 286 and/or the housing 228 include one or more respective openings 304 and 306 for receiving a tool (not shown) for prying the latch member 294 to an unlatched position to facilitate removing the cover 230 from the housing 228.

In addition or alternative to the latch members 294, the cover 230 is connected to the housing 228 using an adhesive (not shown), such as, but not limited to, using potting, RTV silicone, and/or the like. In some embodiments, the adhesive seals the cover 230 with the housing 228. The openings 304 and/or 306 may allow air and/or excess adhesive to escape during curing of the adhesive. It should be understood that when the o-ring 302 and/or the adhesive is used to seal the engagement between the cover body 286 and the housing 228, a portion or all of the mounting side 288 of the cover body 286 may not engage the exterior side 232 of the housing 228, but rather the o-ring 302 and/or the adhesive may space a portion or all of the mounting side 288 of the cover body 286 from the exterior side 232 of the housing 228.

The embodiments described and/or illustrated herein may provide a junction box that is less difficult, less costly, and/or less time-consuming to electrically connect to a PV module than at least some known junction boxes. For example, the embodiments described and/or illustrated herein may provide a junction box having electrical contacts that are less difficult, less costly, and/or less time-consuming to electrically connect to a PV module than at least some known junction boxes.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Dimensions, types of materials, orientations of the various components, and the number and positions of the various components described and/or illustrated herein are intended to define parameters of certain embodiments, and are by no means limiting and are merely exemplary embodiments. Many other embodiments and modifications within the spirit and scope of the claims will be apparent to those of skill in the art upon reviewing the description and illustrations. The scope of the subject matter described and/or illustrated herein should therefore be determined with reference to the appended claims, along with the full scope of equivalents to which such claims are entitled. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

While the subject matter described and/or illustrated herein has been described in terms of various specific embodiments, those skilled in the art will recognize that the subject matter described and/or illustrated herein can be practiced with modification within the spirit and scope of the claims.

What is claimed is:

1. A junction box for electrically connecting a photovoltaic (PV) module to a power distribution system having a mating connector, said junction box comprising:
a housing having a mounting side configured to be mounted on the PV module, the housing comprising a mating interface and an opening extending into the housing through the mounting side, the housing being configured to mate with the mating connector of the power distribution system at the mating interface; and
an electrical contact held by the housing, the electrical contact comprising an integrally formed, one-piece body, the body of the electrical contact comprising a base, a mating end extending from the base, and a PV module end extending from the base, the base of the body of the electrical contact being held within the opening of the housing such that the mating end extends along the mating interface for engagement with the mating connector, the PV module end of the body extending outwardly from the opening on the mounting side of the housing for engagement with foil of the PV module.

2. The junction box according to claim 1, wherein the PV module end of the body of the electrical contact comprises an approximately planar tab.

3. The junction box according to claim 1, wherein at least a portion of the PV module end of the body of the electrical contact extends outwardly from the opening of the housing past the mounting side of the housing.

4. The junction box according to claim 1, wherein the body of the electrical contact is stamped from a single sheet of material.

5. The junction box according to claim 1, wherein the PV module end of the body of the electrical contact comprises at least one of a non-planar structure, a flexible structure, and a resilient structure.

6. The junction box according to claim 1, wherein the mounting side of the housing comprises a mounting surface configured to face a dielectric substrate of the PV module, at least a portion of the PV module end of the body of the electrical contact being offset from the mounting surface of the housing in a direction away from the housing.

7. The junction box according to claim 1, wherein the mounting side of the housing comprises a mounting surface configured to face a dielectric substrate of the PV module, the PV module end of the body of the electrical contact comprising an approximately planar tab having an engagement surface configured to engage the foil of the PV module, the engagement surface extending approximately parallel with the mounting surface of the housing.

8. The junction box according to claim 1, wherein the mating end of the body of the electrical contact comprises a pin.

9. The junction box according to claim 1, wherein the mating interface of the housing comprising a mating receptacle that extends within the housing and communicates with the opening of the housing, the base of the body of the electrical contact held within the opening of the housing such that the mating end of the body extends within the mating receptacle.

10. The junction box according to claim 1, further comprising a contact retainer engaged with the electrical contact and the housing for holding the electrical contact by the housing.

11. The junction box according to claim 1, wherein the electrical contact is a first electrical contact, the junction box comprising a second electrical contact held by the housing, the junction box further comprising a diode electrically connecting the first and second electrical contacts.

12. The junction box according to claim 1, wherein the housing comprises an exterior side, the opening within the housing extending through the exterior side, a cover received within the opening at the exterior side for closing the opening at the exterior side.

13. A junction box and photovoltaic (PV) module assembly comprising:
    a PV module comprising a plurality of PV cells interconnected by a foil; and
    a junction box comprising:
        a housing having a mounting side mounted on the PV module, the housing comprising a mating interface and an opening extending into the housing through the mounting side, the housing being configured to mate with a mating connector at the mating interface; and
        an electrical contact held by the housing, the electrical contact comprising an integrally formed, one-piece body, the body of the electrical contact comprising a base, a mating end extending from the base, and a PV module end extending from the base, the base of the body of the electrical contact being held within the opening of the housing such that the mating end extends along the mating interface for engagement with the mating connector, the PV module end of the body extending outwardly from the opening on the mounting side of the housing, the PV module end of the body being engaged with the foil of the PV module.

14. The junction box and PV module assembly according to claim 13, wherein the PV module end of the body of the electrical contact comprises an approximately planar tab.

15. The junction box and PV module assembly according to claim 13, wherein at least a portion of the PV module end of the body of the electrical contact extends outwardly from the opening of the housing past the mounting side of the housing.

16. The junction box and PV module assembly according to claim 13, wherein the body of the electrical contact is stamped from a single sheet of material.

17. The junction box and PV module assembly according to claim 13, wherein the mating end of the body of the electrical contact comprises a pin.

18. The junction box and PV module assembly according to claim 13, further comprising a contact retainer engaged with the electrical contact and the housing for holding the electrical contact by the housing.

19. The junction box and PV module assembly according to claim 13, wherein the electrical contact is a first electrical contact, the junction box comprising a second electrical contact held by the housing, the junction box further comprising a diode electrically connecting the first and second electrical contacts.

20. A junction box for electrically connecting a photovoltaic (PV) module to a power distribution system having a mating connector, said junction box comprising:
    a housing having a mounting side and an exterior side, the mounting side being configured to be mounted on the PV module, the housing comprising a mating interface and an opening extending through the mounting side and the exterior side, the housing being configured to mate with the mating connector of the power distribution system at the mating interface;
    an electrical contact held by the housing, the electrical contact comprising a mating end and a PV module end, the mating end extending along the mating interface for engagement with the mating connector, the PV module end extending outwardly from the opening on the mounting side of the housing for engagement with foil of the PV module;
    a cover received within the opening of the housing at the exterior side for closing the opening at the exterior side; and
    an o-ring engaged between the housing and the cover for sealing the cover with the housing.

* * * * *